US009593217B2

(12) United States Patent
Aamer et al.

(10) Patent No.: US 9,593,217 B2
(45) Date of Patent: *Mar. 14, 2017

(54) SELF-ASSEMBLED STRUCTURE AND MEMBRANE COMPRISING BLOCK COPOLYMER AND PROCESS FOR PRODUCING THE SAME BY SPIN COATING (VA)

(71) Applicant: PALL CORPORATION, Port Washington, NY (US)

(72) Inventors: Khaled Abdel-Hakim Helmy Aamer, Port Washington, NY (US); Selina Shi, Levittown, NY (US)

(73) Assignee: Pall Corporation, Port Washington, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/292,193

(22) Filed: May 30, 2014

(65) Prior Publication Data

US 2015/0344653 A1 Dec. 3, 2015

(51) Int. Cl.
B01D 71/80 (2006.01)
B01D 69/10 (2006.01)
(Continued)

(52) U.S. Cl.
CPC ............... C08J 9/00 (2013.01); B01D 71/62 (2013.01); B01D 71/80 (2013.01); B05D 1/005 (2013.01);
(Continued)

(58) Field of Classification Search
None
See application file for complete search history.

(56) References Cited

U.S. PATENT DOCUMENTS 3,318,959 A 5/1967 Borman
3,625,977 A 12/1971 Hamb
(Continued)

FOREIGN PATENT DOCUMENTS

EP 0 298 408 A1 1/1989
EP 0 409 291 A2 1/1991
(Continued)

OTHER PUBLICATIONS

Dalphond et al. "Synthesis and self-assembly of polymers containing dicarboximide groups by living ring-opening metathesis polymerization." Macromol. Chem. Phys. 2002, 203, 1988-1994.*
(Continued)

Primary Examiner — Krishnan S Menon
Assistant Examiner — Ryan B Huang
(74) Attorney, Agent, or Firm — Leydig, Voit & Mayer, Ltd.

(57) ABSTRACT

Disclosed are self-assembled structures formed from a self-assembling diblock copolymer of the formula (I):

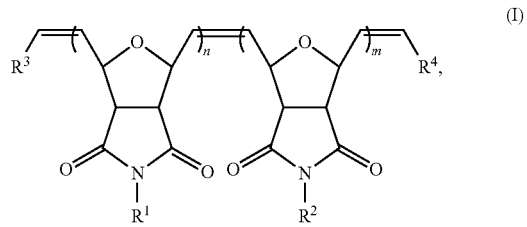

wherein $R^1$-$R^4$, n, and m are as described herein, which find use in preparing porous membranes. In an embodiment, the diblock copolymer is present in the self-assembled structures in a cylindrical morphology. Also disclosed is a method
(Continued)

of preparing a self-assembled structure, which involves spin coating a polymer solution containing the diblock copolymer to obtain a thin film, followed by solvent annealing of the film.

18 Claims, 3 Drawing Sheets

(51) Int. Cl.
*B05D 1/00* (2006.01)
*B01D 71/62* (2006.01)
*C08G 61/12* (2006.01)
*C09D 153/00* (2006.01)
*C08J 9/00* (2006.01)

(52) U.S. Cl.
CPC .......... *C08G 61/12* (2013.01); *C09D 153/00* (2013.01); *C08G 2261/126* (2013.01); *C08G 2261/1412* (2013.01); *C08G 2261/1424* (2013.01); *C08G 2261/3342* (2013.01); *C08G 2261/418* (2013.01); *C08G 2261/614* (2013.01); *C08J 2205/042* (2013.01); *C08J 2353/00* (2013.01); *Y10T 428/249953* (2015.04)

(56) References Cited

U.S. PATENT DOCUMENTS

| | | | |
|---|---|---|---|
| 3,847,867 A | 11/1974 | Heath et al. |
| 4,242,384 A | 12/1980 | Andrew et al. |
| 4,611,048 A | 9/1986 | Peters |
| 4,698,388 A | 10/1987 | Ohmura et al. |
| 4,725,441 A | 2/1988 | Porter et al. |
| 4,945,135 A | 7/1990 | Grubbs et al. |
| 4,948,508 A | 8/1990 | Nakagawa et al. |
| 4,954,256 A | 9/1990 | Degen et al. |
| 4,965,330 A | 10/1990 | Asrar |
| 5,191,026 A | 3/1993 | Nishi et al. |
| 5,198,554 A | 3/1993 | Inagaki et al. |
| 5,202,388 A | 4/1993 | Iio et al. |
| 5,282,965 A | 2/1994 | Urairi et al. |
| 5,286,382 A | 2/1994 | Scarmoutzos et al. |
| 5,462,867 A | 10/1995 | Azad et al. |
| 5,580,934 A | 12/1996 | Nishi et al. |
| 5,599,882 A | 2/1997 | Nishi et al. |
| 5,824,049 A | 10/1998 | Ragheb et al. |
| 5,911,880 A | 6/1999 | Klein et al. |
| 5,969,170 A | 10/1999 | Grubbs et al. |
| 5,976,380 A | 11/1999 | Moya |
| 5,998,326 A | 12/1999 | Hafner et al. |
| 6,039,872 A | 3/2000 | Wu et al. |
| 6,096,020 A | 8/2000 | Hofmann |
| 6,096,070 A | 8/2000 | Ragheb et al. |
| 6,111,121 A | 8/2000 | Grubbs et al. |
| 6,126,825 A | 10/2000 | Shinagawa et al. |
| 6,214,936 B1 | 4/2001 | Mehler et al. |
| 6,354,443 B1 | 3/2002 | Moya |
| 6,420,503 B1 | 7/2002 | Jayaraman et al. |
| 6,486,264 B1 | 11/2002 | Tsunogae et al. |
| 6,669,980 B2 | 12/2003 | Hansen |
| 6,734,386 B1 | 5/2004 | Lauterbach et al. |
| 6,759,537 B2 | 7/2004 | Grubbs et al. |
| 6,846,890 B2 | 1/2005 | Miyaki et al. |
| 6,867,303 B2 | 3/2005 | Grela |
| 6,921,735 B2 | 7/2005 | Hoveyda et al. |
| 7,037,993 B2 | 5/2006 | Taguchi et al. |
| 7,230,066 B2 | 6/2007 | Khouri et al. |
| 7,284,668 B2 | 10/2007 | Charkoudian |
| 7,300,022 B2 | 11/2007 | Muller |
| 7,329,758 B1 | 2/2008 | Grubbs et al. |
| 7,332,609 B2 | 2/2008 | Emrick et al. |
| 7,378,528 B2 | 5/2008 | Herrmann et al. |
| 7,611,629 B2 | 11/2009 | Doucoure et al. |
| 7,628,917 B2 | 12/2009 | Penezina et al. |
| 7,717,273 B2 | 5/2010 | Kozlov et al. |
| 7,750,103 B2 | 7/2010 | Emrick et al. |
| 7,960,555 B2 | 6/2011 | Emrick |
| 8,048,963 B2 | 11/2011 | Fuller et al. |
| 8,049,025 B2 | 11/2011 | Zhan |
| 8,053,531 B2 | 11/2011 | Hirata et al. |
| 8,153,739 B2 | 4/2012 | Tew et al. |
| 8,223,472 B1 | 7/2012 | Dirk et al. |
| 8,232,360 B2 | 7/2012 | Sampson et al. |
| 8,277,914 B2 | 10/2012 | Ogawa et al. |
| 8,283,410 B2 | 10/2012 | Musa |
| 8,329,927 B2 | 12/2012 | Tew et al. |
| 8,420,704 B2 | 4/2013 | Hillmyer et al. |
| 8,440,765 B2 | 5/2013 | Balsara et al. |
| 8,535,590 B2 | 9/2013 | Milner et al. |
| 8,647,730 B2 | 2/2014 | Kudo et al. |
| 2001/0021764 A1 | 9/2001 | Weisse et al. |
| 2002/0040109 A1 | 4/2002 | Fogg et al. |
| 2003/0064884 A1 | 4/2003 | Yao |
| 2005/0176893 A1 | 8/2005 | Rana et al. |
| 2007/0238853 A1 | 10/2007 | Hay et al. |
| 2008/0103256 A1 | 5/2008 | Kim et al. |
| 2009/0082524 A1 | 3/2009 | Tew et al. |
| 2009/0127186 A1 | 5/2009 | Mizomoto et al. |
| 2009/0130665 A1 | 5/2009 | Sleiman et al. |
| 2009/0173694 A1 | 7/2009 | Peinemann et al. |
| 2009/0233236 A1 | 9/2009 | Black et al. |
| 2009/0236309 A1* | 9/2009 | Millward et al. .............. 216/39 |
| 2009/0263725 A1 | 10/2009 | Balsara et al. |
| 2010/0230351 A1 | 9/2010 | Hoving et al. |
| 2011/0120970 A1 | 5/2011 | Joo et al. |
| 2011/0206880 A1 | 8/2011 | Wang et al. |
| 2012/0041137 A1 | 2/2012 | Musa et al. |
| 2012/0077893 A1 | 3/2012 | Hood |
| 2013/0041055 A1 | 2/2013 | Hillmyer et al. |
| 2013/0165661 A1 | 6/2013 | Grubbs et al. |
| 2013/0189504 A1 | 7/2013 | Nealey et al. |
| 2013/0280237 A1 | 10/2013 | Tew et al. |
| 2014/0011958 A1 | 1/2014 | Miyake et al. |

FOREIGN PATENT DOCUMENTS

| | | |
|---|---|---|
| EP | 0 430 585 A2 | 6/1991 |
| EP | 0 713 893 A1 | 5/1996 |
| EP | 0 784 066 A1 | 7/1997 |
| EP | 0 922 486 A1 | 6/1999 |
| EP | 0 968 758 A2 | 1/2000 |
| EP | 1 238 996 A1 | 9/2002 |
| EP | 1 408 064 A1 | 4/2004 |
| EP | 1 783 149 A1 | 5/2007 |
| EP | 1 903 074 A1 | 3/2008 |
| EP | 2 639 247 A1 | 9/2013 |
| JP | S51-151275 A | 12/1976 |
| JP | S52-122278 A | 10/1977 |
| JP | 2010-155919 A | 7/2010 |
| KR | 1020090089041 A | 8/2009 |
| KR | 2010-0128334 A | 12/2010 |
| WO | WO 99/47570 A1 | 9/1999 |
| WO | WO 01/61042 A2 | 8/2001 |
| WO | WO 02/072659 A1 | 9/2002 |
| WO | WO 2004/009605 A2 | 1/2004 |
| WO | WO 2006/130955 A1 | 12/2006 |
| WO | WO 2009/001724 A1 | 12/2008 |
| WO | WO 2010/101882 A1 | 9/2010 |
| WO | WO 2011/112796 A1 | 9/2011 |
| WO | WO 2011/140158 A1 | 11/2011 |
| WO | WO 2013/028308 A1 | 2/2013 |
| WO | WO 2013/097570 A1 | 7/2013 |

OTHER PUBLICATIONS

Runge et al. "Synthesis of comb tri- and tetrablock copolymers catalyzed by the Grubbs first generation catalyst." Macromol. Rapid Commun. 2009, 30, 1392-1398.*

Sankaran et al. "Ring-opening metathesis polymers for biodetection and signal amplification: synthesis and self-assembly." Macromolecules 2010, 43, 5530-5537.*

(56) References Cited

OTHER PUBLICATIONS

Zha et al. "Magnetic properties of cobalt-containing diblock copolymers with cylindrical morphology of different domain sizes." J. Inorg. Organomet. Polym. 2013, 23, 89-94.*

Benmouna et al., "Self-Organization Schemes towards Thermodynamic Stable Bulk Heterojunction Morphologies: A Perspective on Future Fabrication Strategies of Polymer Photovoltaic Architectures" Adv. in Phys. Chem., vol. 2013, Article ID 94818, p. 1-8.*

Adams, Marisa et al., "Investigation of microphase separated dicarboximide-functionalized oxanorbornyl diblock copolymers exhibiting nanostructure," Abstracts of Papers, 247th ACS National Meeting & Exposition, Dallas TX, United States, Mar. 16-20, 2014.

Asif, A. et al., "Hydroxyl terminated poly(ether ether ketone) with pendant methyl group-toughened epoxy clay ternary nanocornposites: Preparation, morphology, and thermomechanical properties," *Journal of Applied Polymer Science*, vol. 106, No. 5, pp. 2936-2946 (Dec. 5, 2007) (Abstract).

Bang, Joona et al., "Defect-Free Nanoporous Thin Films from ABC Triblock Copolymers," *Journal of the American Chemical Society*, vol. 128, pp. 7622-7629 (2006).

"Spin Coat Theory," Brewer Science, Inc., http://www.brewerscience.com/research/processing-theory/spin-coating-theory, downloaded Jun. 30, 2014 (no original publication or copyright date available).

Francis, Bejoy et al., "Synthesis of hydroxyl-terminated poly(ether ether ketone) with pendent *tert*-butyl groups and its use as a toughener for epoxy resins," *Journal of Polymer Science Part B: Polymer Physics*, vol. 44, No. 3, pp. 541-556 (Feb. 1, 2006) (Abstract).

Girotto, Claudio et al.,"Spray coating for fabricating polymer-based organic solar cells," *Global Solar Technology*, pp. 10-13 (Mar. 2010).

Guillen, Gregory R. et al., "Preparation and Characterization of Membranes Formed by Nonsolvent Induced Phase Separation: A Review," *Industrial & Engineering Chemistry Research*, vol. 50, pp. 3798-3817 (2011).

Hahn et al., "Structure Formation of Integral-Asymmetric Membrane of Polystyrene-block-Poly(ethylene oxide)," *J. Polym. Sci. B Polym. Phys.*, 51: 281-290 (2013).

Hall, David B. et al., "Spin Coating of Thin and Ultrathin Polymer Films," *Polymer Engineering and Science*, vol. 38, No. 12, pp. 2039-2045 (Dec. 1998).

Hollister, Adrienne et al., "Synthesis and physical properties of dicarboximide-functionalized oxanorbornyl polymers," Abstracts of Papers, 241st ACS National Meeting & Exposition, Anaheim, CA, United States, Mar. 27-31, 2011.

Hollister, Adrienne et al., "Towards novel thin-film polymer blends: Synthesis and characterization of norbornene related homopolymers and diblock copolymers via ring opening metathesis polymerization," Abstracts of Papers, 239th ACS National Meeting, San Francisco, CA, United States, Mar. 21-25, 2010.

Ledoux, Nele, "Ruthenium Olefin Metathesis Catalysts: Tuning of the Ligand Environment," *Universiteit Gent*, pp. 1-198 (2007).

Li, Li, "Nanoporous Polymers for Membrane Applications," Ph.D. Thesis, DTU Chemical Engineering, pp. 1-180 (Jan. 2012).

Love, Jennifer A. et al., "A Practical and Highly Active Ruthenium-Based Catalyst that Effects the Cross Metathesis of Acrylonitrile," *Angewandte Chemie*, vol. 41, No. 21, pp. 4035-4037 (2002).

Lu, Hua et al., "One-Pot Synthesis of Brush-Like Polymers via Integrated Ring-Opening Metathesis Polymerization and Polymerization of Amino Acid N-Carboxyanhydrides," *Journal of the American Chemical Society*, vol. 131, pp. 13582-13583 (2009).

Mulder, M., "Phase Inversion Membranes," *Membrane Preparation: Phase Inversion Membranes*, pp. 3331-3346 (2000).

Oss-Ronen, Liat et al., "Characterization of Block Copolymer Self-Assembly: From Solution to Nanoporous Membranes," *Macromolecules*, vol. 45, pp. 9631-9642 (2012).

Park, Min et al., "Block Copolymer Lithography: Periodic Arrays of ~$10^{11}$ Holes in 1 Square Centimeter," *Science*, vol. 276, pp. 1401-1404 (May 30, 1997).

Peinemann, Klaus-Viktor et al., "Asymmetric superstructure formed in a block copolymer via phase separation," *Nature Materials*, vol. 6, pp. 992-996 (Dec. 2007).

Posselt, Kyle et al., "Synthesis and characterization of dicarboximide-functionalized oxanorbornyl homopolymer and diblock copolymers," Abstracts of Papers, 243rd ACS National Meeting & Exposition, San Diego, CA, United States, Mar. 25-29, 2012.

Richmond, Victoria et al., "Synthesis and characterization of dicarboximide-functionalized oxanorbornyl homopolymers with ethylene oxide side chains," Abstracts of Papers, 247th ACS National Meeting & Exposition, Dallas, TX, United States, Mar. 16-20, 2014.

Riffle, J.S. et al., "Synthesis of hydroxyl-terminated polycarbonates of controlled number-average molecular weight," *Journal of Polymer Science: Polymer Chemistry Edition*, vol. 20, No. 8, pp. 2289-2301 (Aug. 1982) (Abstract).

Sahu, Niranjan et al., "Fundamental understanding and modeling of spin coating process: A review," *Indian Journal of Physics*, vol. 83, No. 4, pp. 493-502 (2009).

Sommer, William, "Olefin Metathesis," Sigma-Aldrich Chemical Co., Inc., *ChemFlies*, vol. 9, No. 6, pp. 3-11 (2009).

Srinivasan, Siddarth et al., "Solution Spraying of Poly(methyl methacrylate) Blends to Fabricate Micro-textured, Superoleophobic Surfaces," Manuscript (downloaded May 19, 2014).

Thurn-Albrecht, Thomas et al., "Nanoscopic Templates from Oriented Block Copolymer Films," *Advanced Materials*, vol. 12, No. 11, pp. 787-791 (2000).

Walheim, Stefan et al, "Structure Formation via Polymer Demixing in Spin-Cast Films," *Macromolecules*, vol. 30, pp. 4995-5003 (1997).

"Polyester ether ketone (PEEK)," Wikipedia, http://en.wikipedia.org/wiki/PEEK, downloaded Jun. 11, 2014.

Yang, Yong-qiang et al., "Preparation of PPESK Hollow Fiber Asymmetric Nanofiltration Membrane," *The Proceedings of the 3$^{rd}$ International Conference on Functional Molecules*, pp. 295-296 (May/Jun. 2011).

Yun, Yanbin et al, "Preparation of an Ultrafiltration Membrne from Poly(Phthalazine Ether Sulfone Ketone)," *Integrated Concepts in Water Recycling*, pp. 741-752 (2005).

Zhang, Yanfeng et al., "PEG-Polypeptide Dual Brush Block Copolymers: Synthesis and Application in Nanoparticle Surface PEGylation," *ACS Macro Letters*, vol. 2, pp. 809-813 (2013).

Çetinkaya et al., "Preparation of a new nanoconductive ROMP copolymer and its application as solid polymer electrolyte," *Synthetic Metals*, vol. 180, pp. 59-63 (2013).

Metera et al., "Luminescent Iridium(III)-Containing Block Copolymers: Self-Assembly into Biotin-Labeled Micelles for Biodetection Assays," *ACS Macro Letters*, vol. 1, pp. 954-959 (2012).

Vargas et al.,"Synthesis and ring-opening metathesis polymerization (ROMP) of new N-fluoro-phenylnorbornene dicarboximides by 2$^{nd}$ generation ruthenium alkylidene catalysts," *eXRESS Polymer Letters*, vol. 1, No. 5, pp. 274-282 (2007).

Breitenkamp et al., "Rapid communication, Amphiphilic Ruthenium Benzylidene Metathesis Catalyst with PEG-substituted Pyridine Ligands," *Journal of Polymer Science: Part A: Polymer Chemistry*, vol. 43, pp. 5715-5721 (2005).

Çetinkaya et al., "Synethesis of high-T g polymers via ROMP of oxanorbornene dicarboximides with halogen groups," *Heteroatom Chemistry*, vol. 21, No. 1 (Jan. 1, 2010).

Chen B. et al., "Ruthenium Bipyridine-Containing Polymers and Block Copolymers via Ring-Opening Metathesis Polymerization," *Macromolecules*, vol. 37, pp. 5866-5872 (2004).

Dimitriou et al., "Amphiphilic block copolymer surface composition: Effects of spin coating versus spray coating," *Polymer*, vol. 53(6), pp. 1321-1327 (Dec. 26, 2011).

Dirk et al., "High temperature polymer dielectrics from the ring opening metathesis polymerization (ROMP)," *Pulsed Power Conference 2009 (PPC '09)*, IEEE, Piscataway, New Jersey, pp. 332-335 (Jun. 28, 2009).

(56) References Cited

OTHER PUBLICATIONS

Kluger et al., "Functionalized Poly(oxabornene)-Block-Copolymers: Preparation via Romp/Click-Methodology," *Journal of Polymer Science: Part A: Polymer Chemistry,* vol. 45, pp. 485-499 (2007).

Love et al., "A Practical and Highly Active Ruthenium-Based Catalyst that Effects the Cross Metathesis of Acrylonitrile," *Angew. Chem. Int. Ed.,* vol. 41, No. 21, pp. 4035-4037 (2002).

McLaughlin et al., "Three-Dimensional Organization of Block Copolymers on 'DNA-Minimal' Scaffolds," *Journal of the American Chemical Society,* vol. 134, pp. 4280-4286 (2012).

Runge et al., "Synthesis of High Molecular Weight Comb Block Copolymers and Their Assembly into Orders Morphologies in the Solid State," *Journal of the American Chemical Society,* 129(34), pp. 10551-10560 (2007).

Samanta et al., "A Synthesis of PEG- and Phosphorylcholine-Substituted Pyridines to Afford Water-Soluble Ruthenium Benzylidene Metathesis Catalysts", *Macromolecules,* vol. 41, pp. 530-532 (2008).

Samanta et al., "Click chemistry to give pegylated pyridine and water soluble Ruthenium benzylidene catalysts," *Polymer Preprints,* vol. 49, No. 1, p. 150 (2008).

Singh et al., "A review on membrane fabrication: Structure, properties and performance relationship," *Desalination,* vol. 326, pp. 77-95 (Aug. 16, 2013).

Tlenkopatchev et al.: "Gas Transport in Polymers Prepared via Metathesis Copolymerization of exo-N-Phenyl-7-oxanorbornene-5,6-dicarboximide and Norbornene," *Macromolecules,* vol. 36, pp. 8483-8488 (2003).

Vargas et al.: "Gas transport in membranes based on polynorbornenes with fluorinated dicarboximide side moieties," *Journal of Membrane Science,* vol. 361, pp. 78-88 (2010).

Vargas et al.: "Ring-opening metathesis polymerization (ROMP) of N-cycloalkyl-7-oxanorbornene dicarboximides by well-defined ruthenium initiators," *European Polymer Journal,* vol. 40, pp. 1325-1335 (2004).

Wu et al., "Design and Preparation of Porous Polymers," *Chemical Reviews,* vol. 112(7), pp. 3959-4015 (Jul. 11, 2012).

Yoon et al., "Synthesis and Structure-Property Comparisons of Hydrogenated Poly(oxanorbornene-imide)s and Poly(norbornene-imide)s Prepared by Ring-Opening metathesis Polymerization," *Journal of Polymer Science Part A: Polymer Chemistry,* vol. 50, pp. 3914-3921 (2012).

European Patent Office, Extended European Search Report in European Patent Application No. 15169277.9 (Sep. 24, 2015).

Intellectual Property Office of Singapore, Search Report in Singapore Application No. 10201503847S (Sep. 8, 2015).

Korean Intellectual Property Office, Notice of Non-Final Rejection in Korean Application No. 10-2015-0070190 (Aug. 12, 2016).

Japanese Patent Office, Notice of Reasons for Rejection in Japanese Application No. P2015-096638 (Jun. 28, 2016).

Canadian Intellectual Property Office, Office Action in Canadian Application No. 8,892,136 (Jun. 15, 2016).

\* cited by examiner

SELF-ASSEMBLED STRUCTURE AND MEMBRANE COMPRISING BLOCK COPOLYMER AND PROCESS FOR PRODUCING THE SAME BY SPIN COATING (VA)

BACKGROUND OF THE INVENTION

Membranes, particularly nanoporous membranes, are known to have applications in a number of areas including filtration of biological fluids, removal of micropollutants, water softening, wastewater treatment, retention of dyes, preparation of ultrapure water in the electronics industry, and concentration of food, juice, or milk. Methods involving block copolymers, which self-assemble into nanostructures, have been proposed for preparing nanoporous membranes. While self-assembled structures are advantageous in that they produce membranes with uniform pore size and pore size distribution, challenges or difficulties remain with the proposed block copolymers and methods. For example, in some of these methods, a film is produced first from a block copolymer, which is then followed by the removal of one of the blocks of the block copolymer by employing a harsh chemical such as a strong acid or a strong base.

The foregoing indicates that there is an unmet need for membranes made from block copolymers that are capable of self-assembling into nanostructures and for a method for producing nanoporous membranes from these block copolymers, which does not require a removal of one of the blocks after a nanostructure is formed.

BRIEF SUMMARY OF THE INVENTION

The invention provides a self-assembled structure and a porous membrane comprising a diblock copolymer of the formula (I):

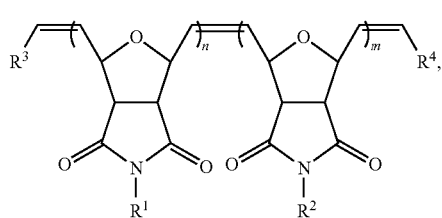

wherein:

$R^1$ is a poly(alkyleneoxide) group of the formula, —(CHR—CH$_2$—O)$_p$—R', wherein p=2-6, R is H or methyl, and R' is H, a $C_1$-$C_6$ alkyl group, or a $C_3$-$C_{11}$ cycloalkyl group;

$R^2$ is a $C_1$-$C_{22}$ alkyl group or a $C_3$-$C_{11}$ cycloalkyl group, each optionally substituted with a substituent selected from halo, alkoxy, alkylcarbonyl, alkoxycarbonyl, amido, and nitro;

one of $R^3$ and $R^4$ is a $C_6$-$C_{14}$ aryl group a heteroaryl group, optionally substituted with a substituent selected from hydroxy, halo, amino, and nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl;

n and m are independently about 10 to about 2000.

The invention also provides a method for preparing the above self-assembled structure comprising:

(i) dissolving the diblock copolymer in a solvent system to obtain a polymer solution;
(ii) spin coating the polymer solution onto a substrate;
(iii) annealing the coating obtained in (ii) to obtain a self-assembled structure; and optionally
(iv) washing the self-assembled structure obtained in (iii).

The invention also provides membranes prepared from the above self-assembled structure.

The present invention takes advantage of the ability of the block copolymers having thermodynamically incompatible blocks to undergo phase separation and self-assemble into nanostructures, thereby creating nanoporous membranes having uniform porosity.

DETAILED DESCRIPTION OF THE INVENTION

Figure 1:
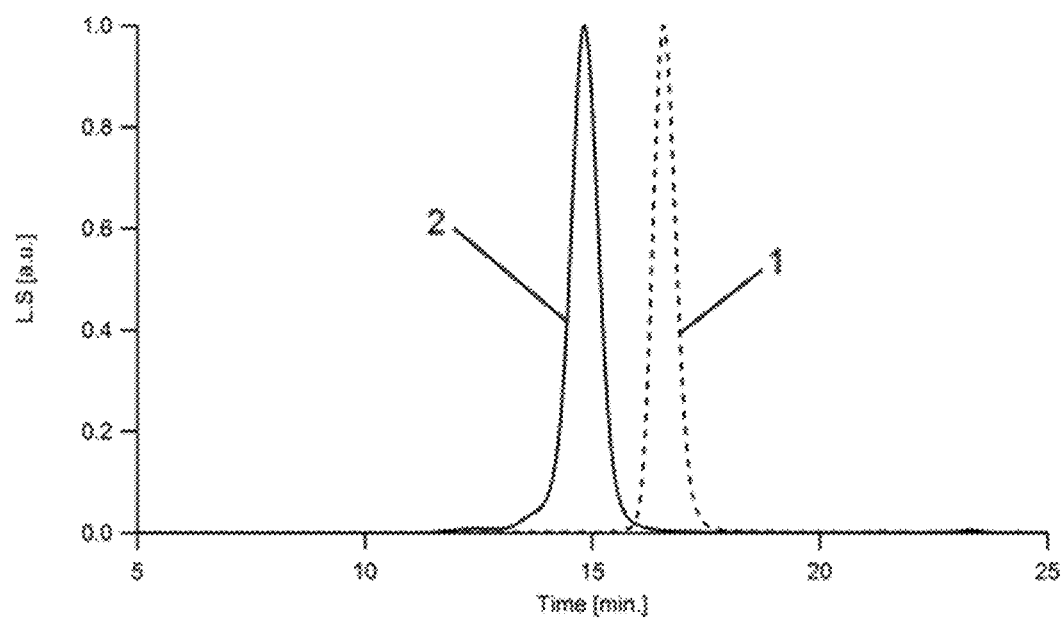
FIG. 1 depicts the overlaid traces of the Multi-angle Laser Light Scattering (MALS) gel permeation chromatograms (GPC) of a homopolymer 1 (a precursor to the diblock copolymer) and a diblock copolymer 2 in accordance with an embodiment of the invention.

In an embodiment, the invention provides a self-assembled structure and a porous membrane comprising a diblock copolymer of the formula (I):

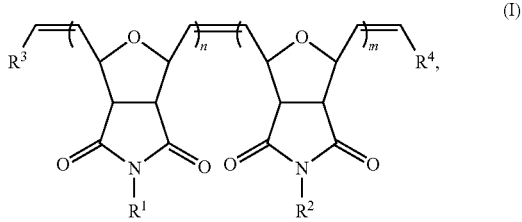

wherein:

$R^1$ is a poly(alkyleneoxide) group of the formula, —(CHR—CH$_2$—O)$_p$—R', wherein p=2-6, R is H or methyl, and R' is H, a $C_1$-$C_6$ alkyl group, or a $C_3$-$C_{11}$ cycloalkyl group;

$R^2$ is a $C_1$-$C_{22}$ alkyl group or a $C_3$-$C_{11}$ cycloalkyl group, each optionally substituted with a substituent selected from halo, alkoxy, alkylcarbonyl, alkoxycarbonyl, amido, and nitro;

one of $R^3$ and $R^4$ is a $C_6$-$C_{14}$ aryl group a heteroaryl group, optionally substituted with a substituent selected from hydroxy, halo, amino, and nitro, and the other of $R^3$ and $R^4$ is a $C_1$-$C_{22}$ alkoxy group, optionally substituted with a substituent selected from carboxy, amino, mercapto, alkynyl, alkenyl, halo, azido, and heterocyclyl;
n and m are independently about 10 to about 2000.

In an embodiment, the invention provides a method for preparing self-assembled structure and a porous membrane comprising a diblock copolymer of the formula (I):

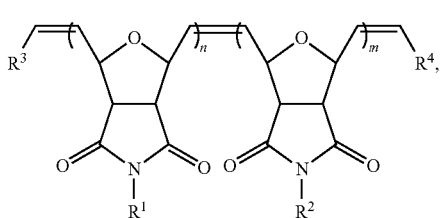

(I)

wherein:
R$^1$ is a poly(alkyleneoxide) group of the formula, —(CHR—CH$_2$—O)$_p$—R', wherein p=2-6, R is H or methyl, and R' is H, a C$_1$-C$_6$ alkyl group, or a C$_3$-C$_{11}$ cycloalkyl group;
R$^2$ is a C$_1$-C$_{22}$ alkyl group or a C$_3$-C$_{11}$ cycloalkyl group, each optionally substituted with a substituent selected from halo, alkoxy, alkylcarbonyl, alkoxycarbonyl, amido, and nitro;
one of R$^3$ and R$^4$ is a C$_6$-C$_{14}$ aryl group, optionally substituted with a substituent selected from hydroxy, halo, amino, and nitro, and the other of R$^3$ and R$^4$ is a C$_1$-C$_{22}$ alkoxy group, optionally substituted with a substituent selected from carboxy, amino, mercapto, alkynyl, alkenyl, halo, azido, and heterocyclyl;
n and m are independently about 10 to about 2000;
the method comprising:
(i) dissolving the diblock copolymer in a solvent system to obtain a polymer solution;
(ii) spin coating the polymer solution onto a substrate;
(iii) annealing the coating obtained in (ii) to obtain a self-assembled structure; and optionally
(iv) washing the self-assembled structure obtained in (iii).

A porous membrane can be prepared from the self-assembled structure via confined swelling leading to the generation of pores. Confined swelling is effected by an annealing step, which could be carried out either by exposing the self-assembled structure to a solvent vapor or by soaking in a liquid solvent.

In accordance with an embodiment, the above diblock copolymer is of the formula (Ia), wherein the monomers are exo isomers:

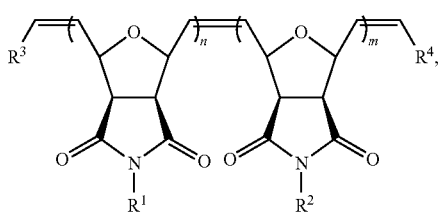

(Ia)

In any of the embodiments above, R is H.
In any of the embodiments above, p is 3-6.
In any of the embodiments above, R' is a C$_1$-C$_6$ alkyl group.

In any of the embodiments above, R$^2$ is a C$_{10}$-C$_{18}$ alkyl group, optionally substituted with a substituent selected from halo, alkoxy, alkylcarbonyl, alkoxycarbonyl, amido, and nitro.

In any of the embodiments above, R$^3$ is a C$_6$-C$_{14}$ aryl group, optionally substituted with a substituent selected from hydroxy, halo, amino, and nitro and R$^4$ is a C$_1$-C$_{22}$ alkoxy group, optionally substituted with a substituent selected from carboxy, amino, mercapto, alkynyl, alkenyl, halo, azido, and heterocyclyl.

In an embodiment, R$^3$ is phenyl, optionally substituted with a substituent selected from hydroxy, halo, amino, and nitro and R$^4$ is a C$_1$-C$_6$ alkoxy group, optionally substituted with a substituent selected from carboxy, amino, mercapto, alkynyl, alkenyl, halo, azido, and heterocyclyl.

In an embodiment, R$^3$ is provided by the ROMP catalyst employed for the polymerization of the monomers.

In an embodiment, R$^4$ is a group provided by the vinyl ether compound employed for terminating the polymerization.

In accordance with the invention, the term "aryl" refers to a mono, bi, or tricyclic carbocyclic ring system having one, two, or three aromatic rings, for example, phenyl, naphthyl, anthracenyl, or biphenyl. The term "aryl" refers to an unsubstituted or substituted aromatic carbocyclic moiety, as commonly understood in the art, and includes monocyclic and polycyclic aromatics such as, for example, phenyl, biphenyl, naphthyl, anthracenyl, pyrenyl, and the like. An aryl moiety generally contains from, for example, 6 to 30 carbon atoms, preferably from 6 to 18 carbon atoms, more preferably from 6 to 14 carbon atoms and most preferably from 6 to 10 carbon atoms. It is understood that the term aryl includes carbocyclic moieties that are planar and comprise 4n+2 π electrons, according to Hückel's Rule, wherein n=1, 2, or 3.

In accordance with the invention, the term "heteroaryl" refers to a cyclic aromatic radical having from five to ten ring atoms of which at least one atom is O, S, or N, and the remaining atoms are carbon. Examples of heteroaryl radicals include pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, and isoquinolinyl. The term "heteroaryl" as used herein, means a monocyclic heteroaryl or a bicyclic heteroaryl. The monocyclic heteroaryl is a five- or six-membered ring. The five-membered ring consists of two double bonds and one sulfur, nitrogen or oxygen atom. Alternatively, the five-membered ring has two double bonds and one, two, three or four nitrogen atoms and optionally one additional heteroatom selected from oxygen or sulfur, and the others carbon atoms. The six-membered ring consists of three double bonds, one, two, three or four nitrogen atoms, and the others carbon atoms. The bicyclic heteroaryl consists of a monocyclic heteroaryl fused to a phenyl, or a monocyclic heteroaryl fused to a monocyclic cycloalkyl, or a monocyclic heteroaryl fused to a monocyclic cycloalkenyl, or a monocyclic heteroaryl fused to a monocyclic heteroaryl. The monocyclic and the bicyclic heteroaryl are connected to the parent molecular moiety through any substitutable atom contained within the monocyclic or the bicyclic heteroaryl. The monocyclic and bicyclic heteroaryl groups of the present invention can be substituted or unsubstituted. In addition, the nitrogen heteroatom may or may not be quaternized, and may or may not be oxidized to the N-oxide. Also, the nitrogen containing rings may or may not be N-protected. Representative examples of monocyclic heteroaryl include, but are not limited to, furanyl, imidazolyl, isoxazolyl, isothiazolyl, oxadiazolyl, oxazolyl, pyridinyl, pyridine-N-oxide, pyridazinyl, pyrimidinyl, pyrazinyl, pyrazolyl, pyrrolyl, tetrazolyl, thiadiazolyl, thiazolyl, thienyl, triazolyl, and triazinyl. Representative examples of bicyclic heteroaryl groups include, but not limited to, benzothienyl, benzoxazolyl, benzimidazolyl, benzoxadiazolyl, 6,7-dihydro-1,3-benzothiazolyl, imidazo[1,2-a]pyridinyl, indazolyl, 1H-indazol-3-yl, indolyl, isoindolyl, isoquinolinyl, naphthyridinyl, pyridoimidazolyl, quinolinyl, quinolin-8-yl, and 5,6,7,8-tetrahydroquinolin-5-yl.

The "alkyl" group could be linear or branched. In accordance with an embodiment, the alkyl group is preferably a $C_1$-$C_{22}$ alkyl. Examples of alkyl group include methyl, ethyl, n-propyl, isopropyl, n-butyl, sec-butyl, isobutyl, tert-butyl, n-pentyl, isopentyl, n-hexyl, hexadecyl, and the like. This definition also applies wherever "alkyl" occurs such as in hydroxyalkyl, monohalo alkyl, dihalo alkyl, and trihalo alkyl. The $C_1$-$C_{22}$ alkyl group can also be further substituted with a cycloalkyl group, e.g., a $C_3$-$C_{11}$ cycloalkyl group.

In any of the above embodiments, the "cycloalkyl" group can be monocyclic or bicyclic. Examples of monocyclic cycloalkyl groups include cyclopropyl, cyclobutyl, cyclopentyl, cyclohexyl, cycloheptyl, and cyclooctyl. Examples of bicyclic cycloalkyl groups include those with one common ring carbon atom such as spirooctane, spirononane, spirodecane, and spiroundecane, and those with two common ring carbon atoms such as bicyclooctane, bicyclononane, bicyclodecane, and bicycloundecane. Any of the cycloalkyl groups could be optionally substituted with one or more alkyl groups, e.g., $C_1$-$C_6$ alkyl groups.

In accordance with an embodiment, the "alkoxy" group is preferably a $C_1$-$C_{22}$ alkoxy. Examples of alkoxy group include methoxy, ethoxy, n-propoxy, isopropoxy, n-butoxy, sec-butoxy, isobutoxy, tert-butoxy, n-pentoxy, isopentoxy, n-hexoxy, hexadecyloxy, and the like.

The term "halo" refers to a halogen selected from the group consisting of fluorine, chlorine, bromine, and iodine, preferably chlorine or bromine.

The term "heterocycle" or "heterocyclic" as used herein, means a monocyclic heterocycle or a bicyclic heterocycle. The monocyclic heterocycle is a three-, four-, five-, six- or seven-membered ring containing at least one heteroatom independently selected from the group consisting of O, N, N(H) and S. The three- or four-membered ring contains zero or one double bond and a heteroatom selected from the group consisting of O, N, N(H) and S. The five-membered ring contains zero or one double bond, and one, two or three heteroatoms selected from the group consisting of O, N, N(H) and S. The six-membered ring contains zero, one or two double bonds and one, two or three heteroatoms selected from the group consisting of O, N, N(H) and S. The seven-membered ring contains zero, one, two, or three double bonds and one, two or three heteroatoms selected from the group consisting of O, N, N(H) and S. The monocyclic heterocycle can be unsubstituted or substituted and is connected to the parent molecular moiety through any substitutable carbon atom or any substitutable nitrogen atom contained within the monocyclic heterocycle. Representative examples of monocyclic heterocycle include, but are not limited to, azetidinyl, azepanyl, aziridinyl, diazepanyl, [1,4]diazepan-1-yl, 1,3-dioxanyl, 1,3-dioxolanyl, 1,3-dithiolanyl, 1,3-dithianyl, homomorpholinyl, homopiperazinyl, imidazolinyl, imidazolidinyl, isothiazolinyl, isothiazolidinyl, isoxazolinyl, isoxazolidinyl, morpholinyl, oxadiazolinyl, oxadiazolidinyl, oxazohnyl, oxazolidinyl, piperazinyl, piperidinyl, pyranyl, pyrazolinyl, pyrazolidinyl, pyrrolinyl, pyrrolidinyl, tetrahydrofuranyl, tetrahydropyranyl, tetrahydrothienyl, thiadiazolinyl, thiadiazolidinyl, thiazolinyl, thiazolidinyl, thiomorpholinyl, 1,1-dioxidothiomorpholinyl (thiomorpholine sulfone), thiopyranyl, and trithianyl. The bicyclic heterocycle is a monocyclic heterocycle fused to a phenyl group, or a monocyclic heterocycle fused to a monocyclic cycloalkyl, or a monocyclic heterocycle fused to a monocyclic cycloalkenyl, a monocyclic heterocycle fused to a monocyclic heterocycle, or a monocyclic heterocycle fused to a monocyclic heteroaryl. The bicyclic heterocycle is connected to the parent molecular moiety through any substitutable carbon atom or any substitutable nitrogen atom contained within the bicyclic heterocycle and can be unsubstituted or substituted. Representative examples of bicyclic heterocycle include, but are not limited to, benzodioxinyl, benzopyranyl, thiochromanyl, 2,3-dihydroindolyl, indolizinyl, pyranopyridinyl, 1,2,3,4-tetrahydroisoquinolinyl, 1,2,3,4-tetrahydroquinolinyl, thiopyranopyridinyl, 2-oxo-1,3-benzoxazolyl, 3-oxo-benzoxazinyl, 3-azabicyclo[3.2.0]heptyl, 3,6-diazabicyclo[3.2.0]heptyl, octahydrocyclopenta[c]pyrrolyl, hexahydro-1H-furo[3,4-c]pyrrolyl, octahydropyrrolo[3,4-c]pyrrolyl, 2,3-dihydrobenzofuran-7-yl, 2,3-dihydrobenzofuran-3-yl, and 3,4-dihydro-2H-chromen-4-yl. The monocyclic or bicyclic heterocycles as defined herein may have two of the non-adjacent carbon atoms connected by a heteroatom selected from N, N(H), O or S, or an alkylene bridge of between one and three additional carbon atoms. Representative examples of monocyclic or bicyclic heterocycles that contain such connection between two non-adjacent carbon atoms include, but not limited to, 2-azabicyclo[2.2.2]octyl, 2-oxa-5-azabicyclo[2.2.2]octyl, 2,5-diazabicyclo[2.2.2]octyl, 2-azabicyclo[2.2.1]heptyl, 2-oxa-5-azabicyclo[2.2.1]heptyl, 2,5-diazabicyclo[2.2.1]heptyl, 2-azabicyclo[2.1.1]hexyl, 5-azabicyclo[2.1.1]hexyl, 3-azabicyclo[3.1.1]heptyl, 6-oxa-3-azabicyclo[3.1.1]heptyl, 8-azabicyclo[3.2.1]octyl, 3-oxa-8-azabicyclo[3.2.1]octyl, 1,4-diazabicyclo[3.2.2]nonyl, 1,4-diazatricyclo[4.3.1.1 3,8]undecyl, 3,10-diazabicyclo[4.3.1]decyl, or 8-oxa-3-azabicyclo[3.2.1]octyl, octahydro-1H-4,7-methanoisoindolyl, and octahydro-1H-4,7-epoxyisoindolyl. The nitrogen heteroatom may or may not be quaternized, and may or may not be oxidized to the N-oxide. In addition, the nitrogen containing heterocyclic rings may or may not be N-protected.

Examples of heterocyclyl groups include pyridyl, piperidinyl, piperazinyl, pyrazinyl, pyrolyl, pyranyl, tetrahydropyranyl, tetrahydrothiopyranyl, pyrrolidinyl, furanyl, tetrahydropyranyl, thiophenyl, tetrahydrothiophenyl, purinyl, pyrimidinyl, thiazolyl, thiazolidinyl, thiazolinyl, oxazolyl, triazolyl, tetrazolyl, tetrazinyl, benzoxazolyl, morpholinyl, thiophorpholinyl, quinolinyl, and isoquinolinyl.

Five-membered unsaturated heterocyclics with and without benzo: furanyl, thiopheneyl, pyrrolyl, pyrazolyl, pyrazolinyl, imidazolyl, imidazolinyl, dithiazolyl, furazanyl, 1,2,3-triazolyl, tetrazolyl, 1,2,4-triazolyl, oxadiazolyl, thiadiazolyl, isoxazolyl, isoxazolinyl, oxazolyl, oxazolinyl, phosphonyl, isothiazolyl, thiazolyl, thiazolinyl, isothiazolyl, isothiazolidinyl, benzofuranyl, benzothiophenyl, indolyl, benzimidazolyl, benzoxazolinyl, and benzothiazolinyl.

Whenever a range of the number of atoms in a structure is indicated (e.g., a $C_{1-22}$, a $C_{1-12}$, $C_{1-8}$, $C_{1-6}$, or $C_{1-4}$ alkyl, alkoxy, etc.), it is specifically contemplated that any subrange or individual number of carbon atoms falling within the indicated range also can be used. Thus, for instance, the recitation of a range of 1-22 carbon atoms (e.g., $C_1$-$C_{22}$), 1-20 carbon atoms (e.g., $C_1$-$C_{20}$), 1-18 carbon atoms (e.g., $C_1$-$C_{20}$), 1-16 carbon atoms (e.g., $C_1$-$C_{16}$), 1-14 carbon atoms (e.g., $C_1$-$C_{14}$), 1-12 carbon atoms (e.g., $C_1$-$C_{12}$), 1-10 carbon atoms (e.g., $C_1$-$C_{10}$), 1-8 carbon atoms (e.g., $C_1$-$C_8$) 1-6 carbon atoms (e.g., $C_1$-$C_6$), 1-4 carbon atoms (e.g., $C_1$-$C_4$), 1-3 carbon atoms (e.g., $C_1$-$C_3$), or 2-8 carbon atoms (e.g., $C_2$-$C_8$) as used with respect to any chemical group (e.g., alkyl, alkoxy, alkylamino, etc.) referenced herein encompasses and specifically describes 1, 2, 3, 4, 5, 6, 7, 8, 9, 10, 11, 12, 13, 14, 15, 16, 17, 18, 19, 20, 21, or 22 carbon atoms, as appropriate, as well as any sub-range thereof, e.g., 1-2 carbon atoms, 1-3 carbon atoms, 1-4 carbon atoms, 1-5 carbon atoms, 1-6 carbon atoms, 1-7 carbon atoms, 1-8 carbon atoms, 1-9 carbon atoms, 1-10 carbon atoms, 1-11 carbon atoms, 1-12 carbon atoms, 1-13 carbon atoms, 1-14 carbon atoms, 1-15 carbon atoms, 1-16 carbon atoms, 1-17 carbon atoms, 1-18 carbon atoms, 1-19 carbon atoms, 1-20 carbon atoms, 1-21 carbon atoms, and 1-22 carbon atoms, and anything in between such as 2-3 carbon atoms, 2-4 carbon atoms, 2-5 carbon atoms, 2-6 carbon atoms, 2-7 carbon atoms, 2-8 carbon atoms, 2-9 carbon atoms, 2-10 carbon atoms, 2-11 carbon atoms, 2-12 carbon atoms, 2-12 carbon atoms, 2-13 carbon atoms, 2-14 carbon atoms, 2-15 carbon atoms, 2-16 carbon atoms, 2-17 carbon atoms, 2-18 carbon atoms, 2-19 carbon atoms, 2-20 carbon atoms, 2-21 carbon atoms, and 2-22 carbon atoms, 3-4 carbon atoms, 3-5 carbon atoms, 3-6 carbon atoms, 3-7 carbon atoms, 3-8 carbon atoms, 3-9 carbon atoms, 3-10 carbon atoms, 3-11 carbon atoms, 3-12 carbon atoms, 3-13 carbon atoms, 3-14 carbon atoms, 3-15 carbon atoms, 3-16 carbon atoms, 3-17 carbon atoms, 3-18 carbon atoms, 3-19 carbon atoms, 3-20 carbon atoms, 3-21 carbon atoms, and 3-22 carbon atoms, and 4-5 carbon atoms, 4-6 carbon atoms, 4-7 carbon atoms, 4-8 carbon atoms, 4-9 carbon atoms, 4-10 carbon atoms, 4-11 carbon atoms, 4-12 carbon atoms, 4-13 carbon atoms, 4-14 carbon atoms, 4-15 carbon atoms, 4-16 carbon atoms, 4-17 carbon atoms, 4-18 carbon atoms, 4-19 carbon atoms, 4-20 carbon atoms, 4-21 carbon atoms, 4-22 carbon atoms, etc., as appropriate.

In the above embodiments, "n" and "m" represent the average degree of polymerization of the respective monomers.

In accordance with embodiments, n is about 10 to about 1000, about 10 to about 500, about 10 to about 250, about 20 to about 1000, about 20 to about 500, about 20 to about 250, about 30 to about 1000, about 30 to about 500, about 30 to about 250, about 40 to about 1000, about 40 to about 500, about 40 to about 250, about 50 to about 1000, about 50 to about 500, about 50 to about 250, about 60 to about 1000, about 60 to about 500, or about 60 to about 250.

In any of the above embodiments, m is about 50 to about 2000, about 50 to about 1500, about 50 to about 1000, about 100 to about 2000, about 100 to about 1500, about 100 to about 1000, about 150 to about 2000, about 150 to about 1500, about 150 to about 1000, about 200 to about 2000, about 200 to about 1500, or about 200 to about 1000.

In any of the above embodiments, n is typically about 30 to about 350, preferably about 70 to about 200, and more preferably about 100 to about 150.

In any of the above embodiments of the diblock copolymer, m is typically about 75 to about 900, preferably about 180 about 500, and more preferably about 250 to about 400.

The diblock copolymer can have any suitable total molecular weight, for example, a number average molecular weight ($M_n$) of from about 35 kDa to about 450 kDa; in certain embodiments, the diblock copolymer has an $M_n$ of from about 75 kDa to about 300 kDa; in certain other embodiments, the diblock copolymer has an $M_n$ of about 250 kDa. In certain embodiments, the diblock copolymer has an $M_n$ of 129 kDa.

The double bonds in the diblock copolymer can have any suitable orientation, cis, trans, and they can be distributed in a random manner.

The diblock copolymer may self-assemble into any suitable morphology, for example, but not limited to, spherical or body centered cubic morphology, cylindrical morphology, lamellar morphology, or double gyroid morphology. The type of nanostructure into which the copolymers self-assemble would depend, among others, on the volume fraction of the two blocks in the block copolymer as well as the nature of the solvent system.

For example, at a polymer volume fraction ratio range ($f_A$:$f_B$) of the two monomers of 37-50:63-50, formation of a lamellar morphology involving a stack of layers of equivalent domain size is favored, at a volume fraction ratio range of 15-70:85-30, formation of a cylindrical morphology where the minor polymer component forms cylinders in a matrix of major polymer block component is favored, and at a volume fraction ratio range of 7-15:83-85, formation of body centered cubic phase where the minor polymer component forms spheres in a matrix of the major polymer block component is favored. At a volume fraction ratio range of 33-37:67-33, formation of a double gyroid morphology is favored.

Cylindrical morphology includes a phase domain morphology having discrete tubular or cylindrical shapes. The tubular or cylindrical shapes may be hexagonally packed on a hexagonal lattice. In embodiments, the cylindrical domain size is from about 5 nm to about 100 nm.

Lamellar morphology includes a phase domain morphology having layers of alternating compositions that are generally oriented parallel with respect to one another. In embodiments, the lamellar domain size is from about 5 nm to about 100 nm.

The double gyroid morphology comprises two interpenetrating continuous network. In embodiments, the double gyroid domain size is from about 5 nm to about 100 nm.

Spherical morphology or bcc morphology refers to a phase domain morphology having spherical domains of one block arranged on a body centered cubic lattice in a matrix of the second block. In embodiments, the spherical morphology domain size is from about 5 nm to about 100 nm.

In an embodiment, the polymerized second monomer (bearing $^{R2}$) and the polymerized first monomer (bearing $^{R1}$) are present in the diblock copolymer in any suitable volume fraction. For example, the % volume fraction of the first monomer to that of the second monomer can be in the range of about 15:about 85 to about 30:about 70, preferably in the range of about 19:about 81 to about 25:about 75, and more preferably about 20:about 80. In an embodiment, the volume fraction of the second monomer is about 74%.

In an embodiment, the volume fraction of the second monomer to that of the first monomer is about 2.8:1, which favors the formation of cylindrical morphology. The mass fraction of the second monomer to that of the first monomer is about 2.2:1.

In a specific embodiment, the self-assembled structure and the membrane comprise a diblock copolymer of formula (I) has the following structure, in particular, wherein n is 100 and m is 180:

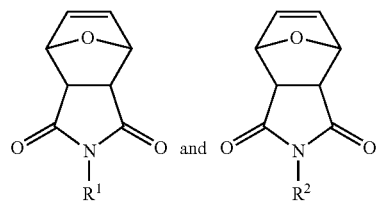

with a ring opening metathesis polymerization (ROMP) catalyst to obtain a ring-opened polymer having a living chain end;

(ii) polymerizing the other of the two monomers on the living end of the ring-opened polymer obtained in (i) to obtain a diblock copolymer having a living end; and (iii) terminating the living end of the diblock copolymer obtained in (ii) with an optionally substituted alkyl vinyl ether.

The alkyl group of the alkyl vinyl ether could be optionally substituted with a substituent, for example, a substituent selected from hydroxy, halo, amino, and nitro.

In the above method, the monomer that is first polymerized is of the formula:

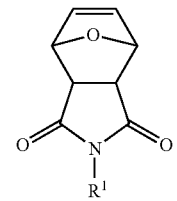

After the polymerization of the above monomer, the second monomer that is polymerized thereon is a monomer of the formula:

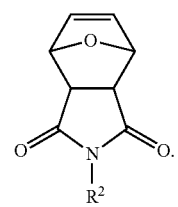

The first monomer and the second monomer can be an exo or endo stereochemical configuration. In an embodiment, the first and second monomers are of the exo configuration, e.g., a monomer having the exo isomer at 98% or higher.

In the first and second monomers, $R^1$ and $R^2$ are the same as described above for the diblock copolymer of formula (I). The first and second monomers are (oxa)norbornene (di) carboxylic imide derived monomers. The monomers can be prepared by any suitable method, for example, starting from maleimide and furan via a Diels-Alder reaction, illustrated below:

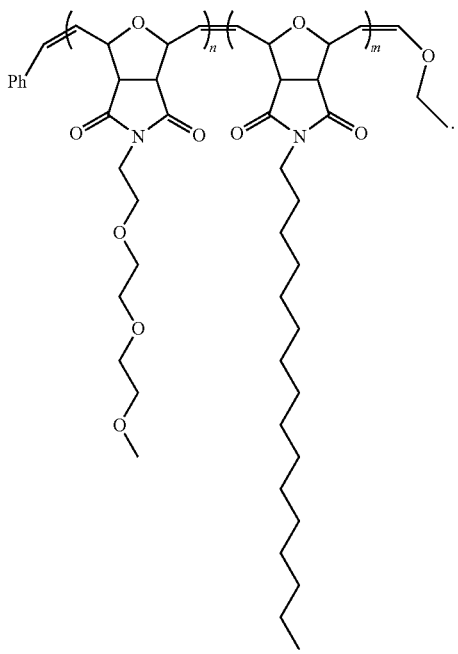

In an embodiment, the self-assembled structure and the membrane comprise the diblock copolymer of formula (I) has the following structure where the monomers were in the exo configuration, in particular, wherein n is 100 and m is 180:

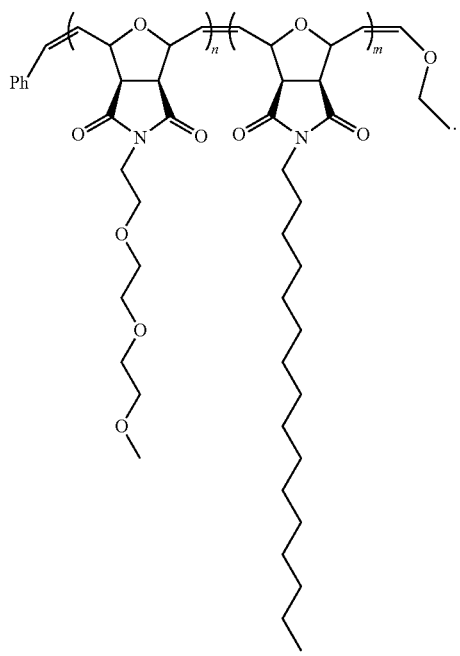

The diblock copolymers described above can be prepared by a method comprising:

(i) polymerizing one of the two monomers of the formulas:

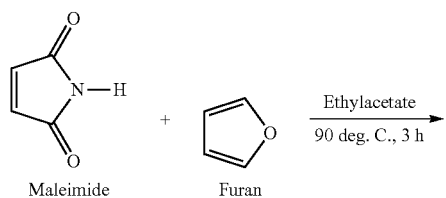

Maleimide + Furan → (Ethylacetate, 90 deg. C., 3 h)

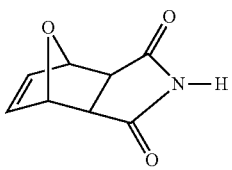

7-oxanorbornene-5,6-dicarboxylic imide

Mitsunobu Coupling
HO~~~~~~14
DIAD, Ph3P, THF, 24 h,
0-24 deg C.

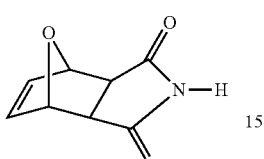

exo-7-oxanorbornene-5,6-dicarboxyimide (C1)

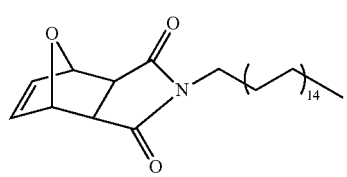

exo-7-oxanorbornene-N-hexadecyl-5,6-dicarboxyimide

The first monomer can be synthesized via Mitsunobu Coupling reaction, as illustrated below:

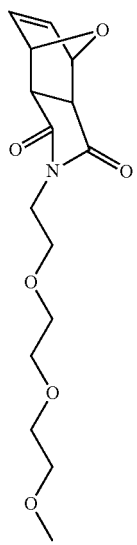

exo-7-oxanorbornene-5,6-dicarboxyimide

Mitsunobu Coupling
HO~O~O~O~
THF, Ph3P, DIAD, 0 to 24° C.

exo-7-oxanorbornene-N-triethyleneglycol monomethylether-5,6-dicarboxyimide

Alternatively, the first monomer can be synthesized by the reaction of N-triethyleneglycol monomethylether maleimide with furan via a Diels-Alder reaction.

The second monomer can be synthesized via Mitsunobu Coupling, as illustrated below.

The polymerization of the monomers is carried out by ring-opening olefin metathesis polymerization (ROMP), in which a cyclic olefin monomer is polymerized or copolymerized by ring-opening of the cyclic olefin monomer. Typically a transition metal catalyst containing a carbene ligand mediates the metathesis reaction.

Any suitable ROMP catalyst can be used, for example, Grubbs' first, second, and third generation catalysts, Umicore, Hoveyda-Grubbs, Schrock, and Schrock-Hoveyda catalysts can be employed. Examples of such catalysts include the following:

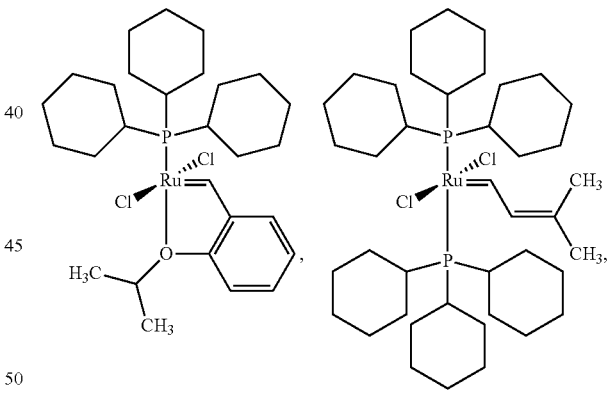

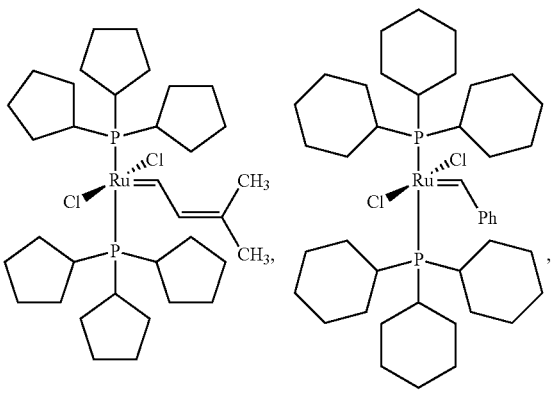

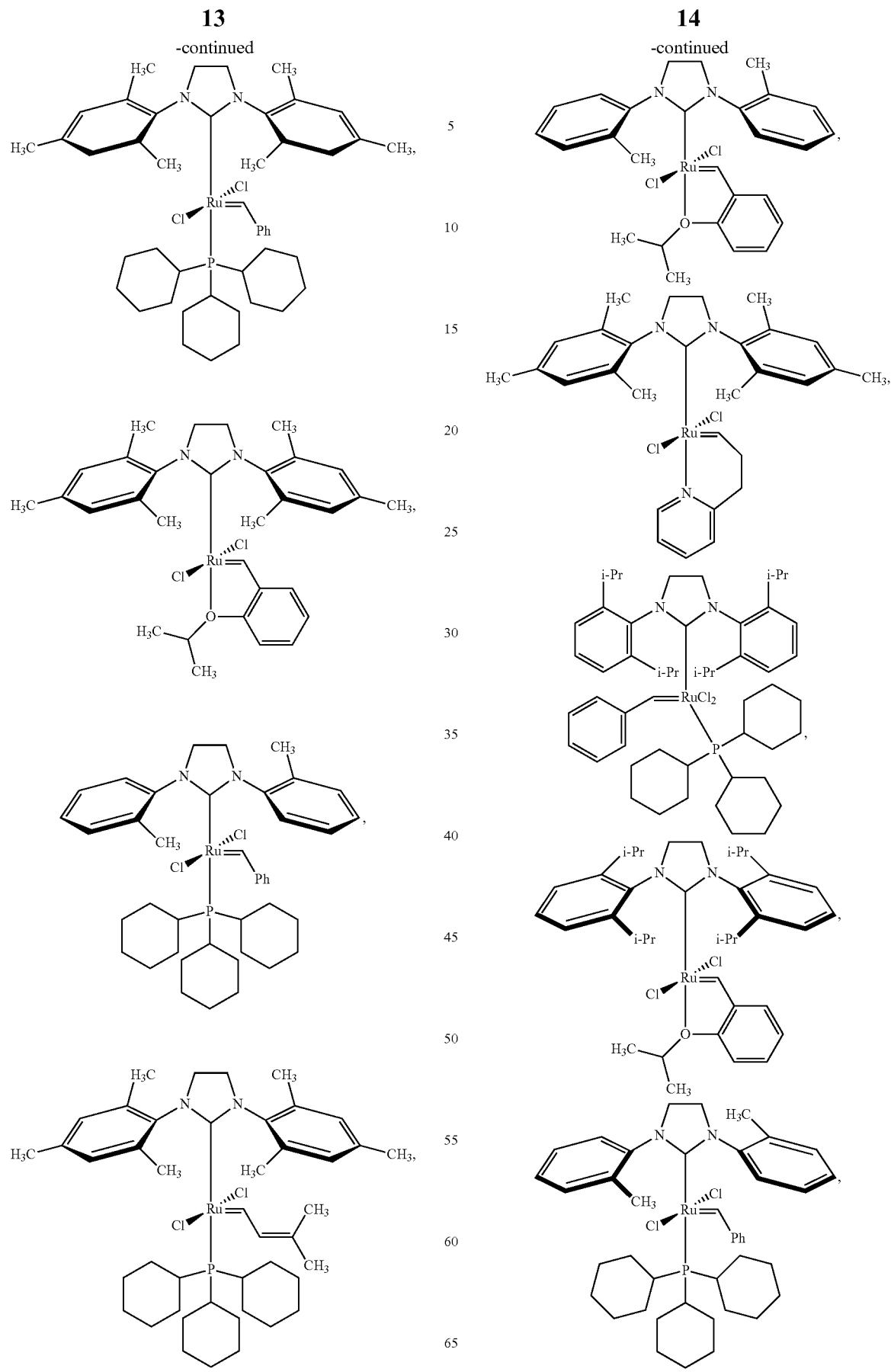

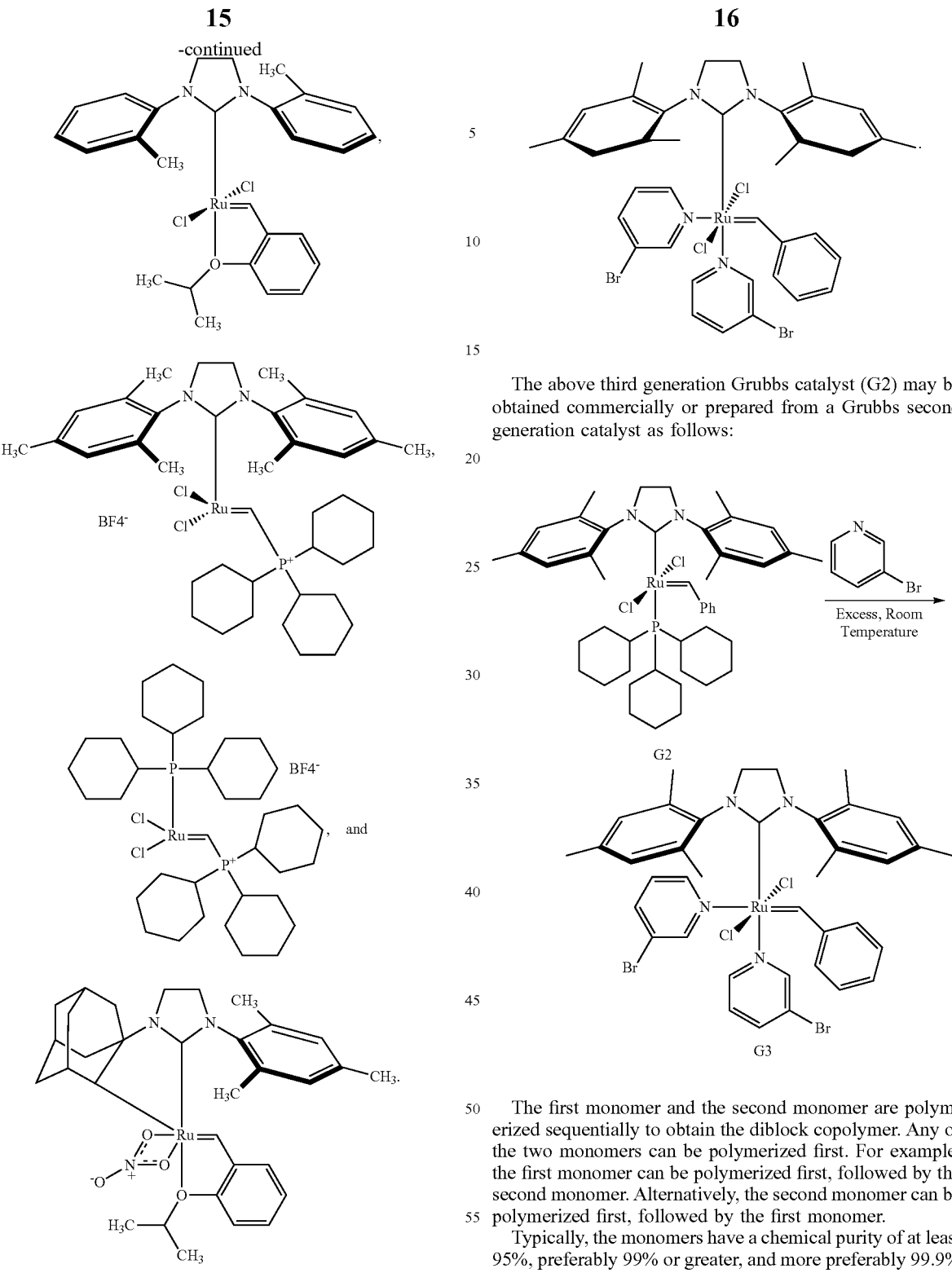

In an embodiment, Grubbs' third generation catalysts are particularly suitable due to their advantages such as stability in air, tolerance to multiple functional groups, and/or fast polymerization initiation and propagation rates. In addition, with the Grubbs' third generation catalysts, the end groups can be engineered to accommodate any compatible groups, and the catalyst can be recycled readily. A preferred example of such a catalyst is:

The above third generation Grubbs catalyst (G2) may be obtained commercially or prepared from a Grubbs second generation catalyst as follows:

The first monomer and the second monomer are polymerized sequentially to obtain the diblock copolymer. Any of the two monomers can be polymerized first. For example, the first monomer can be polymerized first, followed by the second monomer. Alternatively, the second monomer can be polymerized first, followed by the first monomer.

Typically, the monomers have a chemical purity of at least 95%, preferably 99% or greater, and more preferably 99.9% or greater. It is preferred that the monomers are free of impurities that will interfere with the polymerization, e.g., impurities that will affect the ROMP catalyst. Examples of such impurities include amines, thiols (mercaptans), acids, phosphines, and N-substituted maleimides.

The polymerization of the monomers is conducted in a suitable solvent, for example, solvents generally used for conducting ROMP polymerizations. Examples of suitable solvents include aromatic hydrocarbons such as benzene, toluene, and xylene, aliphatic hydrocarbons such as n-pentane, hexane, and heptane, alicylic hydrocarbons such as cyclohexane, and halogenated hydrocarbons such as dichloromethane, dichloroethane, dichloroethylene, tetrachloroethane, chlorobenzene, dichlorobenzene, and trichlorobenzene, as well as mixtures thereof.

When polymerization is carried out in the organic solvent, the monomer concentration can be in the range of 1 to 50 wt %, preferably 2 to 45 wt %, and more preferably 3 to 40 wt %.

The polymerization can be carried out at any suitable temperature, for example, from −20 to +100° C., preferably 10 to 80° C.

The polymerization can be carried out for any time suitable to obtain the appropriate chain length of each of the blocks, which can be from about 1 minute to 100 hours.

The amount of catalyst can be chosen in any suitable amount. For example, the molar ratio of the catalyst to the monomer can be about 1:10 to about 1:1000, preferably about 1:50 to 1:500, and more preferably about 1:100 to about 1:200. For example, the molar ratio of the catalyst to the monomer could be 1:n and 1:m, where n and m are the average degrees of polymerization.

After the polymerization of the two monomers, the chain end of the diblock copolymer is terminated by adding an optionally substituted alkyl vinyl ether to the polymerization mixture.

The diblock copolymer can be isolated by suitable techniques such as precipitation with a nonsolvent.

The homopolymer formed during the preparation of the diblock copolymer and the diblock copolymer of the invention can be characterized for its molecular weight and molecular weight distribution by any known techniques. For example, a MALS-GPC technique can be employed. The technique uses a mobile phase to elute, via a high pressure pump, a polymer solution through a bank of columns packed with a stationary phase. The stationary phase separates the polymer sample according to the chain size followed by detecting the polymer by three different detectors. A series of detectors can be employed, e.g., an Ultraviolet detector (UV-detector), followed by a multi-angle laser light scattering detector (MALS-detector), which in turn, is followed by a refractive index detector (RI-detector) in a row. The UV-detector measures the polymer light absorption at 254 nm wavelength; the MALS-detector measures the scattered light from polymer chains relative to mobile phase.

The diblock copolymers of the invention are preferably highly monodisperse. For example, the copolymers have an Mw/Mn of 1.01 to 1.2, preferably 1.05 to 1.10.

The present invention provides a self-assembled structure and a porous membrane comprising a diblock copolymer described above.

In an embodiment, the self-assembled structure is prepared by spin coating a solution of the diblock copolymer. To prepare the self-assembled structure, the diblock copolymer is first dissolved in a suitable solvent or solvent system and cast as a thin film by spin coating.

The polymer solution can be prepared by any suitable method known to those skilled in the art. The diblock copolymer is added to the solvent system and stirred until a homogeneous solution is obtained. If desired, the solution can be stirred for an extended time to allow the diblock copolymer to assume its thermodynamically favorable structure in the solution. The diblock copolymer is dissolved in a good solvent or a mixture containing good solvents.

Embodiments of a suitable solvent system include a solvent or a mixture of solvents selected from halogenated hydrocarbons, ethers, amides, and sulfoxides. In an embodiment, the solvent system includes a volatile solvent, for example, a solvent having a boiling point less than 100° C.

For example, the solvent system includes a solvent or a mixture of solvents selected from dichloromethane, 1-chloropentane, 1,1-dichloroethane, N,N-dimethylformamide (DMF), N,N-dimethylacetamide (DMA), N-methylpyrrolidone (NMP), dimethylsulfoxide (DMSO), tetrahydrofuran (THF), 1,3-dioxane, and 1,4-dioxane.

Thus, for example, a mixture of DMF and THF, a mixture of DMA and THF, a mixture of DMSO and THF, a mixture of DMSO and 1-chloropentane, a mixture of NMP and 1-chloropentane, a mixture of DMF and 1-chloropentane, a mixture of 1,3-dioxane and THF, a mixture of 1,4-dioxane and THF, or a mixture of 1,3- or 1,4 dioxane, DMF, and THF can be employed as the solvent system.

In a preferred embodiment, a mixture of DMF and THF, a mixture of DMA and THF, a mixture of DMA and 1-chloropentane, a mixture of DMSO and THF, a mixture of 1,3-dioxane and THF, a mixture of 1,4-dioxane and THF, can be employed as the solvent system.

In a more preferred embodiment, dichloromethane or a mixture of N,N-dimethylformamide and tetrahydrofuran can be used as the solvent system.

In the above embodiments, where a mixture of solvents is used as the solvent system, the mixture can include any suitable ratio of the solvents, for example, in a binary solvent mixture, either of the solvents can be present in a volume ratio of 80/20, 75/25, 70/30, 65/35, 60/40, 55/45, or 50/50, or any ratio therebetween. In a ternary solvent system, any of the three solvents can be present in any suitable ratio, for example, a volume ratio of 80/10/10, 75/15/10, 70/20/10, 65/25/10, 60/30/10, 55/25/30, 40/40/20, or 30/30/40 or any ratio therebetween.

The polymer solution can contain any suitable amount of the diblock copolymer. In accordance with an embodiment, the polymer solution contains about 0.1 to about 2%, preferably about 0.5 to about 1.5%, and more preferably about 0.8 to about 1.2% by weight of the diblock copolymer. In an example, the polymer solution contains about 1% by weight of the diblock copolymer. The polymer concentration can control the thickness of the film, and hence the membrane, obtained from spin coating.

Spin coating typically involves depositing a small volume of a polymer solution onto a generally flat substrate, preferably onto the center of the substrate. The polymer solution can be deposited by the use of a syringe or dropper, or continuously deposited from a tank.

When the polymer solution is deposited, the substrate may be stationary or spinning at a low speed, e.g., up to about 500 rpm. Following the deposition of the polymer solution, the substrate is accelerated to a high speed, for example, about 3000 rpm or more. In an embodiment, the substrate is accelerated to spin speeds of about 1500 rpm to about 6000 rpm. The polymer solution flows radially on the substrate owing to the action of the centrifugal force exerted by the spinning, and the excess of the polymer solution is ejected off the edge of substrate. Once the desired spinning speed is reached, the spinning speed is maintained for a suitable period of time, for example, for a period of 1 min to 1 h, preferably 1.5 min. The film that is formed on the substrate continues to thin slowly until it reaches an equilibrium thickness or until it turns solid-like due to a rise in the viscosity of the solution as the solvent evaporates therefrom. The thickness of the film can be controlled by varying the spinning speed for a given polymer concentration.

The film can be cast to any suitable thickness, typically about 50 nm to about 500 nm thick, preferably about 100 to about 300 nm, and more preferably about 100 nm.

The atmosphere maintained above the spinning substrate can be any suitable atmosphere, for example, ambient atmosphere, an atmosphere of controlled humidity and/or temperature, an inert gas atmosphere, or the coating carried out under vacuum. In an embodiment, a solvent vapor atmosphere can be maintained to anneal and induce self-assembly of the block copolymer.

Any suitable substrate can be used to spin coat the polymer solution. The substrate can be porous or nonporous. Examples of suitable substrates include glass, silicon wafer, metal plate, polymer or plastic film, and a plastic film, e.g., polyvinyl alcohol, coated on a glass substrate or on a silicon wafer.

The substrate surface has an influence on the resulting morphology orientation, and the orientation or morphology outcome is determined based on the thermodynamic interaction between the substrate and each block within the diblock copolymer. If the substrate surface has favorable interaction with one of the two blocks, the diblock copolymer will self-assemble in such a way that it maximizes the interaction by spreading and exposing the block that it has favorable interaction with. For example, in the case of cylinder morphology the cylinder will interface with the substrate surface in which the cylinder will be parallel to the surface if the substrate has higher affinity to one block than the other. If the substrate surface has neutral or little affinity toward either block, the cylinders will be aligned normal to the substrate.

The spin coated film is annealed in order to further advance or complete the self-assembling process, or microphase separation, of the diblock copolymer. Annealing is carried out in the presence of a suitable solvent vapor. Any of the solvents identified above for the solvent system can be employed as a solvent vapor to carry out the annealing. For example, dichloromethane can be employed as a vapor.

Annealing can be carried out for any suitable length of time, for example, 0.1 hour to 1 month or more, 5 hours to 15 days or more, or 10 hours to 10 days or more. Optionally, the film is washed to remove any residual solvents to recover the porous membrane.

In an embodiment, the substrate, e.g., a polymeric substrate, can be dissolved away in a suitable solvent, thereby recovering the thin film. For example, where a thin film is cast on a silicon wafer with a $SiO_2$ layer grown on top, the $SiO_2$ layer can be dissolved in hydrofluoric acid to release and recover the thin film of the block copolymer.

In an embodiment, the recovered film can be attached to a more porous substrate, thereby yielding a composite self-assembled structure or composite membrane where the nanoporous layer of the block copolymer serves as the retentive layer and the more porous substrate layer serves as support. The support can be made of any suitable polymer, for example, polyaromatics; sulfones (e.g., polysulfones, including aromatic polysulfones such as, for example, polyethersulfone (PES), polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles ((PANs) including polyalkylacrylonitriles), cellulosic polymers (such as cellulose acetates and cellulose nitrates), fluoropolymers, and polyetherether ketone (PEEK).

Without wishing to be bound by any theory or mechanism, the formation of a nanostructure is believed to take place as follows. The diblock copolymer in solution experiences certain thermodynamic forces. Since the diblock copolymer comprises two chemically different blocks of polymer chains connected by a covalent bond, there exists an incompatibility between the two blocks. In addition, there exists a connectivity constraint imparted by the connecting covalent bond. As a result of these thermodynamic forces, the diblock copolymer when dissolved in an appropriate solvent system self-assemble into microphase separated domains that exhibit ordered morphologies at equilibrium. When a film is cast from a dilute solution, the diblock copolymer forms micelles composed of a core and a corona, each made of a different block. In dilute solution, the micelles tend to be isolated from each other. However, in concentrated solution, as for example, when the solvent is removed from a thin film of the solution by evaporation, the micelles tend to aggregate with the result that the coronas merge to form a continuous matrix and the cores merge to form porous channels.

The block copolymer's ability to form ordered structures depends on a number of factors, including the polymer's relaxation rate, its viscosity, its concentration, and the nature of the solvent, in particular its chi parameter or the Hansen solubility parameter. A neutral solvent to both the blocks tends to orient the cylindrical pores normal to the membrane surface. The solvent system chosen to dissolve the diblock copolymer provides the driving force for free energy minimization and formation of ordered structures. Accordingly, the choice of the solvent or solvent system is an important factor in obtaining ordered nanostructures.

In accordance with an embodiment, the diblock copolymer self-assembles into a porous structure in a matrix assuming a hexagonal order in which the minor block forms the porous hexagonal domains in a matrix of the major block. The minor block is the one composed of a monomer whose degree of polymerization is less than that of the monomer constituting the major block. The pores in the hexagonal domain are about 60 nm to about 80 nm in size, with an average size of about 70 nm. In an embodiment, the density of pores is $1.2 \times 10^{15}$ pores/m$^2$.

In accordance with an embodiment of the invention, the porous membrane is a nanoporous membrane, for example, a membrane having pores of diameter between 1 nm and 100 nm.

A porous structure can be generated from the self-assembled structure, particularly one with cylindrical morphology, via a confined swelling step, which is carried by annealing. The annealing step could be done in either a solvent vapor or soaking in liquid solvent. The solvent should be a good solvent for the minor volume fraction block that forms the cylinder core and non-solvent for the major volume block forming the matrix. While not intending to be held to any theory or mechanism, it is believed that, as the self-assembled structure is annealed the cylinder core becomes swollen by the solvent, leading to an increase of the cylinder volume. As the cylinder cores spread outside the matrix surface, the spreading forces the cylinders to create pores. The matrix thickness also increases.

Examples of solvents that can be used for the annealing include tetrahydrofuran (THF), butyacetate, ethylactate, methylethylketone, and acetone. The solvent or mixture of solvents can be at any suitable temperature, for example, from ambient temperature, for example, 20° C. to 25° C., to elevated temperatures, such as up to 40° C., 50° C., 60° C., 70° C., 80° C., or 90° C.

Membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the membrane can have a variety of configurations, including planar, flat sheet, pleated, tubular, spiral, and hollow fiber.

Membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The following examples further illustrate the invention but, of course, should not be construed as in any way limiting its scope.

Example 1

This example provides the materials used in the preparation of the monomers and polymers.

Maleimide, furan, diisopropylazodicarboxylate (DIAD), triphenylphosphine ($Ph_3P$), 1-haxadecanol, tetrahydrofuran (THF), ethyl acetate, N-phenylmaleimide, acetonitrile, methanol, Grubbs second generation catalyst, 3-bromopyridine, and pentane were obtained from Sigma-Aldrich Co. and used without further treatment. Dichloropentane, also obtained from Sigma-Aldrich Co., was treated with basic alumina before use.

Example 2

This example illustrates the preparation of exo-7-oxanorbornene-5,6-dicarboxyimide (C1), an intermediate in the preparation of the first and second monomers in accordance with an embodiment of the invention.

In a clean 500 mL round bottom flask (RBF) equipped with magnetic stirring bar, furan (21.0 g, 309 mmol) was added to a solution of maleimide (25 g, 258 mmol) in 250 mL of ethyl acetate. The mixture was heated at 90° C. for 30 h. C1 was obtained as white precipitate from solution upon washing with ether (100 mL, 3×) and filtration. The white solid was dried under vacuum at room temperature for 24 h. C1 was obtained as a pure exo-isomer in yield of 29 g, 68%.
$^1$H-NMR (300 MHz, $CDCl_3$): δ (ppm) 8.09 (s, 1H), 6.53 (s, 2H), 5.32 (s, 2H), 2.89 (s, 2H).

Example 3

This example illustrates the preparation of dichloro[1,3-bis(2,4,6-trimethylphenyl)-2-imidazolidinylidene](benzylidene)bis(3-bromopyridine)ruthenium(II) (G3) catalyst.

The second generation Grubbs catalyst (G2) illustrated above (1.0 g, 1.18 mmol) was mixed with 3-bromopyridine (1.14 mL, 11.8 mmol) in 50 mL flask. Upon stirring at room temperature for 5 min, the red mixture turned into bright green. Pentane (40 mL) was added with stirring for 15 minutes and green solid was obtained. The mixture was cooled in the freezer for 24 h and filtered under vacuum. The resulting G3 catalyst, a green solid, was washed with cold pentane and dried under vacuum at room temperature to give a yield of 0.9 g, 88% yield.

Example 4

This example illustrates the preparation of a first monomer in accordance with an embodiment of the invention, exo-7-oxanorbornene-N-triethyleneglycolmonomethylether-5,6-dicarboxyimide).

A 1 L round-bottom flask was charged with exo-7-oxanorbornene-5,6-dicarboxyimide (82.6 g; 0.5 mol), triethyleneglycol monomethyl ether (70.4 mL; 0.45 mol) and triphenylphosphine (144.3 g; 0.55 mol). The contents were vigorously stirred with anhydrous tetrahydrofuran (650 mL) until all the solids dissolved. The mixture was cooled in an ice-bath, followed by the drop-wise addition of diethyl azodicarboxylate (87 mL; 0.55 mol) diluted with anhydrous tetrahydrofuran (50 mL), while maintaining vigorous stirring and ice cooling. The reaction mixture was allowed to slowly warm up to ambient temperature and stirring continued for 24-48 h. Tetrahydrofuran was removed by rotary evaporation and the concentrate was diluted with diethyl ether (1 L) and the resulting slurry was stirred at the ambient temperature for 4 h. The insoluble solids were filtered off, washed with diethyl ether (2×150 mL) and the filtrate and washes were combined and concentrated by rotary evaporation. The resulting residue was diluted with distilled water (750 mL) with vigorous stirring. The precipitate was filtered off, washed with water (2×75 mL) and the filtrate and washes were combined and extracted with diethyl ether (4×200 mL). The aqueous layer was then saturated by adding solid NaCl followed by extraction with dichloromethane (5×200 mL). The ethereal and dichloromethane extracts were analyzed by TLC and the fractions deemed sufficiently pure were pooled, dried with anhydrous magnesium sulfate, filtered and concentrated to constant weight. The obtained yellow viscous liquid was judged by the NMR analysis to be sufficiently pure for subsequent polymerizations. Product yield was 81.4 g (60%). $^1$H-NMR (300 MHz, $CDCl_3$): 6.51 (s, 2H), 5.26 (s, 2H), 3.65-3.72 (m, 2H), 3.55-3.62 (m, 8H), 3.51-3.54 (m, 2H), 3.37 (s, 3H), 2.87 (s, 2H).

Example 5

This example illustrates the preparation of monomer exo-7-oxanorbornene-N-hexadecyl-5,6-dicarboxyimide in accordance with an embodiment of the invention.

In a clean 500 mL RBF equipped with magnetic stinting bar, a mixture of exo-7-oxanorbornene-5,6-dicarboxyimide (C1) (10 g, 61 mmol), $Ph_3P$ (23.84 g, 91 mmol), and 1-hexadecanol (17.6 g, 72.7 mmol) was dissolved in anhydrous THF (130 mL) under a stream of dry nitrogen gas. The solution was cooled in ice bath. DIAD (22.1 g, 109.3 mmol) was added from dropping funnel drop-wise to the cooled solution. The reaction mixture was allowed to warm up to room temperature and stirred for 24 h. THF was removed by rotary evaporation till dryness to obtain a white solid. The monomer was obtained from the crude as white solid upon crystallization from methanol (2×) and drying at room temperature under vacuum for 24 h (yield of 18.6 g, 80%). $^1$H-NMR (300 MHz, $CDCl_3$): δ (ppm) 6.5 (s, 2H), 5.26 (s, 2H), 5.32 (s, 2H), 3.45 (t, 2H), 2.82 (s, 2H), 1.56-1.38 (m, 2H), 1.28-1.1 (m, 24H), 0.88 (t, 3H).

Example 6

This example illustrates the preparation of a diblock copolymer for preparing a membrane in accordance with an embodiment of the invention.

The Grubbs $3^{rd}$ generation (G3) catalyst (57 mg, 0.064 mmol) was weighed in a 40 mL vial equipped with a fluoropolymer resin-silicone septa open-top cap. The G3 was dissolved in argon-degassed DCM (30 mL) and transferred via a cannula to a clean 1 L RBF equipped with a stirring bar. A solution of the monomer from Example 4 (2.0 g, 6.42 mmol) in DCM (5 mL) was degassed with argon and transferred into the G3 solution and stirred for 80 minutes. An aliquot of 1-2 mL of the homopolymer formed was taken after 80 minutes for molecular weight characterization. A solution of the monomer from Example 5 (6.25 g, 16.1 mmol) in DCM (320 mL) was degassed with argon and transferred into the growing homopolymer solution and was stirred for another 65 minutes. Ethylvinylether (2 mL) was added to the yellow solution of the diblock copolymer to terminate the reaction and allowed to stir for another 20 min. The polymer was precipitated in MeOH (2 L, 2×) to recover the pure polymer as a white solid. The polymer was filtered and dried under vacuum at room temperature. $^1$H-NMR (300 MHz, $CDCl_3$): δ (ppm) 6.0 (s broad, 2H), 5.7 (s broad, 2H), 5.2-4.8 (s broad, 2H), 4.6-4.3 (s broad, 2H), 3.9-3.1 (broad m, 17H), 1.8-1.4 (broad m, 2H), 1.36-0.9 (s broad, 28H) 0.88 (t, 3H).

Example 7

This example illustrates a method to characterize the diblock copolymer involving the Multi-angle Laser Light Scattering and gel permeation chromatography (GPC).

The homopolymer and diblock copolymer obtained in Example 6 was characterized for their molecular weight and molecular weight distribution properties by the MALS-GPC technique under the following conditions:
Mobile phase: Dichloromethane (DCM).
Mobile phase temperature: 30° C.
UV wavelength: 245 nm.
Columns used: three PSS SVD Lux analytical columns (Styrene-divinylbenzene copolymer network), columns have stationary phase beads of 5 micrometers and has the pore sizes of 1000 A, 100,000 A, and 1000,000 A, and guard columns.
Flow rate: 1 mL/min.
GPC system: waters HPLC alliance e2695 system with UV and RI detectors
MALS system: The DAWN HELEOS 8 system with 8 detectors operating a laser at 664.5 nm.

The chromatograms are depicted in FIG. 1. The diblock copolymer 2 eluted earlier than homopolymer 1 since it had a higher molecular weight.

Example 8

This example illustrates a method for preparing a self-assembled structure in accordance with an embodiment.

The process involves preparation of a casting solution, casting a thin film followed by annealing the film in a good solvent for both blocks. A 1.0% mass per volume solution of the diblock copolymer from Example 6 was prepared in either a mixture of N,N-dimethylformamide (DMF) and tetrahydrofuran (THF) of 70/30 volume % composition or a mixture of N,N-dimethylacetamide (DMAC) and 1-chloropentane 70/30 volume % composition or dichloromethane neat solvent. The solutions were stirred at room temperature for 3 days before they were used.

A thin film of each of the above polymer solution in neat dichloromethane solvent was spin coated on a silicon wafer substrate at a spinning rate of 2000 rpm. The films obtained were annealed in DCM chamber for 3 days. The films were then imaged with atomic force microscopy (AFM) to reveal the ordered nanostructure.

Figure 2:
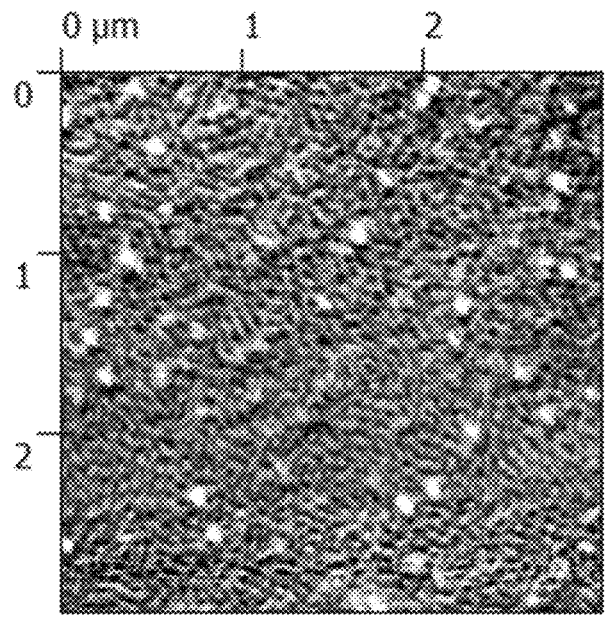
FIG. 2 depicts Atomic Force Microscopic (AFM) phase image of the surface of a self-assembled structure in accordance with an embodiment of the invention. The self-assembled structure was prepared by spin coating a block copolymer solution on a glass substrate at a spinning rate of 2000 rpm.
Figure 3:
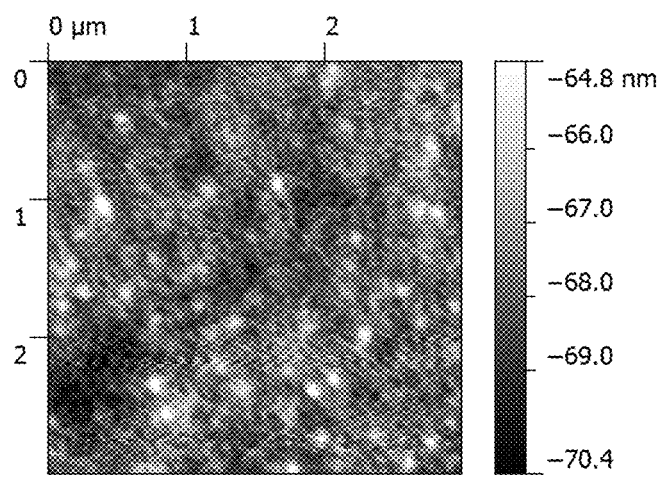
FIG. 3 depicts AFM height image of the surface of a self-assembled structure depicted in FIG. 2.
Figure 4:
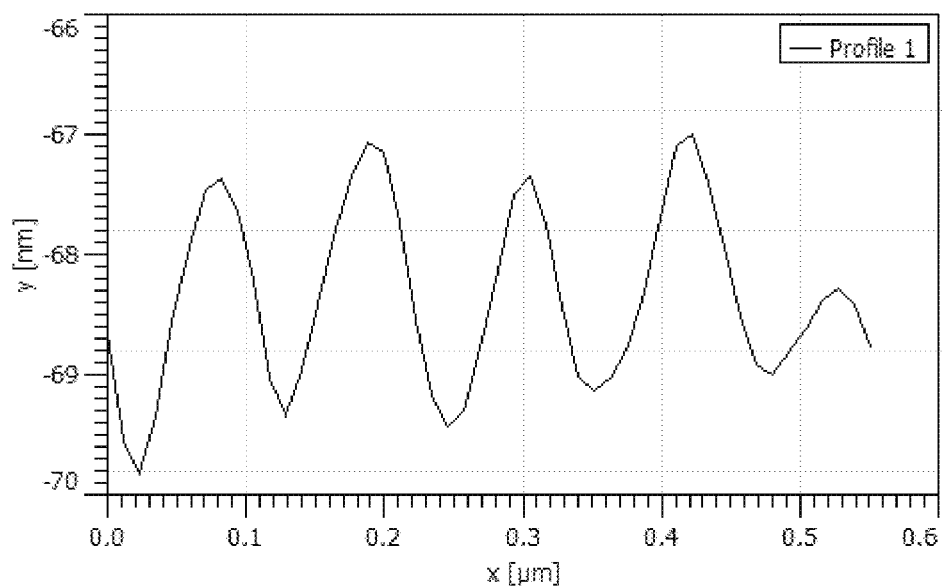
FIG. 4 depicts the profile of the phase separated domains of the self-assembled structure depicted in FIG. 2-3.

FIG. 2 depicts the AFM phase image of the surface of a self-assembled structure in accordance with an embodiment of the invention. FIG. 3 depicts the AFM height image of the surface of a self-assembled structure depicted in FIG. 2. FIG. 4 depicts the profile of the phase separated domains of the self-assembled structure depicted in FIG. 2-3. From the AFM images, it can be seen that the two domains of the phase separated block copolymer are arranged in a hexagonal order.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing a self-assembled porous membrane comprising a diblock copolymer of the formula (I):

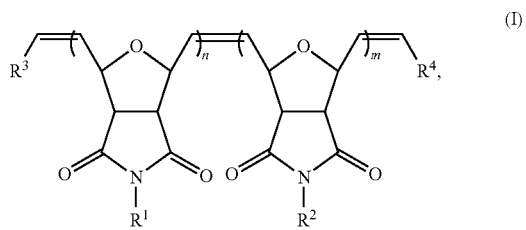

(I)

wherein:
R$^1$ is a poly(alkyleneoxide) group of the formula, —(CHR—CH$_2$—O)$_p$—R', wherein p=2-6, R is H or methyl, and R' is H, a C$_1$-C$_6$ alkyl group, or a C$_3$-C$_{11}$ cycloalkyl group;
R$^2$ is a C$_1$-C$_{22}$ alkyl group or a C$_3$-C$_{11}$ cycloalkyl group, each optionally substituted with a substituent selected from halo, alkoxy, alkylcarbonyl, alkoxycarbonyl, amido, and nitro;
one of R$^3$ and R$^4$ is a C$_6$-C$_{14}$ aryl group or a heteroaryl group, optionally substituted with a substituent selected from hydroxy, halo, amino, and nitro, and the other of R$^3$ and R$^4$ is a C$_1$-C$_{22}$ alkoxy group, optionally substituted with a substituent selected from carboxy, amino, mercapto, alkynyl, alkenyl, halo, azido, and heterocyclyl; and n and m are independently about 10 to about 2000;
wherein the volume fraction of the monomer bearing R$^2$ to that of the monomer bearing R$^1$ in the block copolymer is about 2.8:1; and the membrane has a cylindrical morphology;
the method comprising:
(i) dissolving the diblock copolymer in a solvent system to obtain a polymer solution;
(ii) spin coating the polymer solution onto a substrate;
(iii) annealing the coating obtained in (ii) to obtain a self-assembled porous membrane; and optionally
(iv) washing the self-assembled porous membrane obtained in (iii).

2. The method of claim 1, wherein R is H.

3. The method of claim 1, wherein p is 3-6.

4. The method of claim 1, wherein R' is a C$_1$-C$_6$ alkyl group.

5. The method of claim 1, wherein R' is methyl.

6. The method of claim 1, wherein R$^2$ is a C$_{10}$-C$_{18}$ alkyl group, optionally substituted with a substituent selected from halo, alkoxy, alkylcarbonyl, alkoxycarbonyl, amido, and nitro.

7. The method of claim 1, wherein R$^3$ is phenyl.

8. The method of claim 1, wherein R$^4$ is a C$_1$-C$_6$ alkoxy group.

9. The method of claim 1, wherein n is about 30 to about 350 and m is about 180 to about 500.

10. The method of claim 1, wherein the diblock copolymer of formula (I) has the following structure:

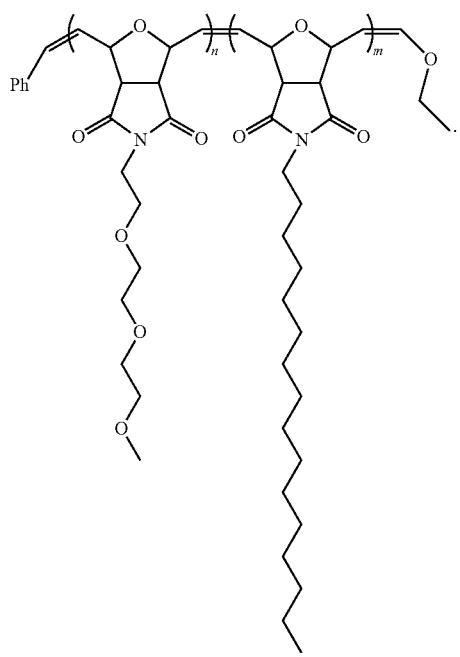

11. The method of claim 1, wherein the solvent system includes a solvent or a mixture of solvents selected from halogenated hydrocarbons, ethers, amides, and sulfoxides.

12. The method of claim 1, wherein the solvent system includes a solvent or a mixture of solvents selected from dichloromethane, 1-chloropentane, 1,1-dichloroethane, dimethylformamide, dimethylacetamide, N-methylpyrrolidone, dimethyl sulfoxide, tetrahydrofuran, 1,3-dioxane, and 1,4-dioxane.

13. The method of claim 1, wherein the polymer solution contains about 0.1 to about 2% by weight of the diblock copolymer.

14. The method of claim 1, wherein the substrate is selected from glass, silicon wafer, metal plate, plastic film, and a plastic film coated on a glass surface or on a silicon wafer.

15. The method of claim 1, wherein the substrate is porous.

16. The method of claim 1, wherein the annealing is carried out in the presence of a solvent vapor.

17. A self-assembled porous membrane prepared by the method of claim 1.

18. The self-assembled porous membrane of claim 17, wherein the diblock copolymer in the membrane has a cylindrical morphology perpendicular to the plane of the membrane and the membrane has pores whose diameters are in the range of about 40 to 60 nm and pores extend all the way down to the film thickness and at a depth of about 50 nm.

* * * * *